(12) United States Patent
Shakal

(10) Patent No.: US 7,331,779 B2
(45) Date of Patent: Feb. 19, 2008

(54) CONCURRENT COOLING MOLD

(75) Inventor: Wayne A. Shakal, Taylors Falls, MN (US)

(73) Assignee: Advanced Tool, Inc., Blaine, MN (US)

( * ) Notice: Subject to any disclaimer, the term of this patent is extended or adjusted under 35 U.S.C. 154(b) by 125 days.

(21) Appl. No.: 11/315,115

(22) Filed: Dec. 22, 2005

(65) Prior Publication Data

US 2006/0099297 A1 May 11, 2006

Related U.S. Application Data

(63) Continuation of application No. PCT/US2004/020051, filed on Jun. 23, 2004.

(60) Provisional application No. 60/480,633, filed on Jun. 23, 2003.

(51) Int. Cl.
*B29C 45/64* (2006.01)

(52) U.S. Cl. ........................ 425/572; 425/574; 425/576

(58) Field of Classification Search .............. 425/572, 425/574, 588, 576; 264/297.8, 328.11
See application file for complete search history.

(56) References Cited

U.S. PATENT DOCUMENTS

| | | | |
|---|---|---|---|
| 3,516,123 A * | 6/1970 | Lang et al. ................. | 425/588 |
| 3,621,533 A | 11/1971 | Bertrandi | |
| 4,125,247 A | 11/1978 | Gabrys | |
| 5,053,173 A * | 10/1991 | Sticht .................... | 264/328.11 |
| 5,114,327 A | 5/1992 | Williamson et al. | |
| 5,185,119 A * | 2/1993 | Schad et al. ............. | 264/297.2 |
| 6,261,085 B1 * | 7/2001 | Steger et al. ............... | 425/588 |
| 6,386,849 B1 | 5/2002 | Kroeger et al. | |
| 6,986,653 B2 * | 1/2006 | Unterlander et al. ... | 264/328.11 |
| 2002/0172736 A1 * | 11/2002 | Chasles et al. ............ | 425/576 |
| 2004/0119205 A1 * | 6/2004 | Eichhorn et al. ........ | 264/328.8 |

* cited by examiner

*Primary Examiner*—Tim Heitbrink
(74) *Attorney, Agent, or Firm*—Fredrikson & Byron, PA

(57) ABSTRACT

This is an apparatus and method of reducing the cycle time needed to produce molded parts. The cycle time is reduced by moving the molded part while still encapsulated within the mold cavity and core away from the injection position to one or more cooling positions and an ejection position. This enables the cooling and ejection portion of the molding cycle to be performed concurrently with the injection portion of the cycle for proceeding parts.

23 Claims, 10 Drawing Sheets

Prior Art

CONCURRENT COOLING MOLD

RELATED APPLICATIONS

This application is a continuation of and claims priority to International Application No. PCT/US2004/020051, filed Jun. 23, 2004, which in turn claims priority to U.S. Provisional Patent Application No. 60/480,633 filed Jun. 23, 2003, the teachings of all of which are incorporated herein by reference.

BACKGROUND

The molding process includes a certain amount of cooling or cure time before the mold can be opened and the molded article can be removed. In specific applications the geometry of the molded article is such that it during the cooling process it will shrink away from the cavity side of the mold and form around the core side of the mold. Prior art takes advantage of this characteristic of the molding process by moving the core that the molded article is formed around away from the injection position prior to completion of the cooling portion of the process to one or more cooling positions and then subsequently to an ejection position once the cooling portion of the molding process is completed. The cooled mold article is then removed from the core.

Movement of the core with the molded part formed around it is typically achieved through the use of a rotating turret block incorporated into the mold or as part of the injection molding press. A typical mold system of the prior art is illustrated in FIG. 10.

The problem with such prior art systems is that they limit the overall processing cycle time by requiring enough cooling to allow the molded article to be shrink away from the cavity side of the mold. The second problem with prior art is that is not applicable for molded articles that require convective heat removal from both the cavity and core sides of the mold. The third problem with prior art is that it is only applicable for molded articles with distinct part geometry that will allow the molded article to shrink and form around the core side of mold and stay attached to the core side during the movement of the core. The fourth problem with prior art is that isn't applicable for molded articles that have cavity side features as well as core side features that the molded article can shrink around. The fifth problem with prior art is that it is not always applicable for molded articles that have cavity undercuts or other part features that must be formed by mechanical movements such as cams or lifts on the cavity side of the mold halves

SUMMARY

The invention is a mold apparatus for making molded products. This invention would be applicable but not limited to molding processes such as plastics injection, multi-component insert molded, metal injection, blow molding, die cast, etc. A revolving turret block about either a latitudinal or longitudinal axis is either integrated into a mold frame or into the molding press. The turret block includes at least one mold core and cavity for forming molded articles thereon at least one face of the revolving turret block. The molded articles are retained within the mold cores and cavities through subsequent cycles until cooling is complete.

BRIEF DESCRIPTION

FIG. 1 is an exploded view of invention components
FIG. 2 is a more detailed view of turret assembly
FIG. 3 is a view of complete turret assembly within carriage assembly and plates
FIG. 4 is a diagram of motion of components in a molding cycle
FIG. 5 is a diagram of turret rotating to allow cooling of moldings
FIG. 6 shows repositioning of components following turret rotation
FIG. 7 shows removal of moldings
FIG. 8 details another embodiment of the invention
FIG. 9 shows an example of multiple moldings within the same core and cavity components for molded articles requiring more than one material.
FIG. 10 is a example of prior art.

DETAILED DESCRIPTION

This invention could be used for the production of various plastic injection molded parts in which cooling is a significant portion of the overall cycle time. Applications include pen barrels, syringes, pipettes, caps and closures, toothbrushes, razor handles, screwdrivers, road markers, etc.

A mold in which the mold components or inserts (identified herein as cavity and core) forming the molded article are able to move with the molded article from the injection position or fill position to cooling and/or ejection positions. Because the cooling and ejection portion of the molding cycle are preformed concurrently with the proceeding cycle, and because the molded parts are fully encompassed by continuously cooled mold components, the molded parts are cooled in a uniform manner and the overall throughput the mold is increased significantly.

The mold components forming the molded article are moved along with the molded article to successive positions through the use of a revolving turret block either integrated into the mold itself or integrated into the molding press. In other words, the rotation function can be performed by rotary drive mechanisms that are built into the tool carrier system or rotation can be performed by rotary table that is part of the injection molding machine. The turret is mounted to the rotary table which is a component of the molding press subsequently moving by rotation of the table.

The mold components forming the molded article can be separated allowing the molded article be removed while concurrently injecting and cooling successive molded articles positioned on other areas of the turret assembly.

In FIG. 1, an exploded and schematic side view of an embodiment showing a rotatable turret 4, a fixed plate 1, carriage assembly 2 and moveable plate 3. Fixed plate 1 is mounted to the stationary plate of the injection molding machine and may or may not be mechanically attached to carriage assembly 2. The fixed plates' main function is to convey plasticized resin into core and cavity sets 5,6. Moveable plate 3 is mounted to the moving plate on the injection molding machine and is mechanically attached to the carriage assembly 2. The moveable plates 3 main function is to pull the carriage assembly 2 open, then separating from the carriage assembly to allow clearance that allows for rotation of the turret 4.

FIG. 2 shows expanded view of the turret assembly with cavity component 5 moved away from core component 6.

The turret 7 shows multiple sets of cavity and core components with numbered positions to identify position change later in the description.

FIG. 3 shows the closed positioning of stationary plate 1 and moving plate 2 with top of carriage assembly 2 removed to show the position of turret assembly with turret 7, cavity components 5 and core components 6 in ready state.

Figure 7:
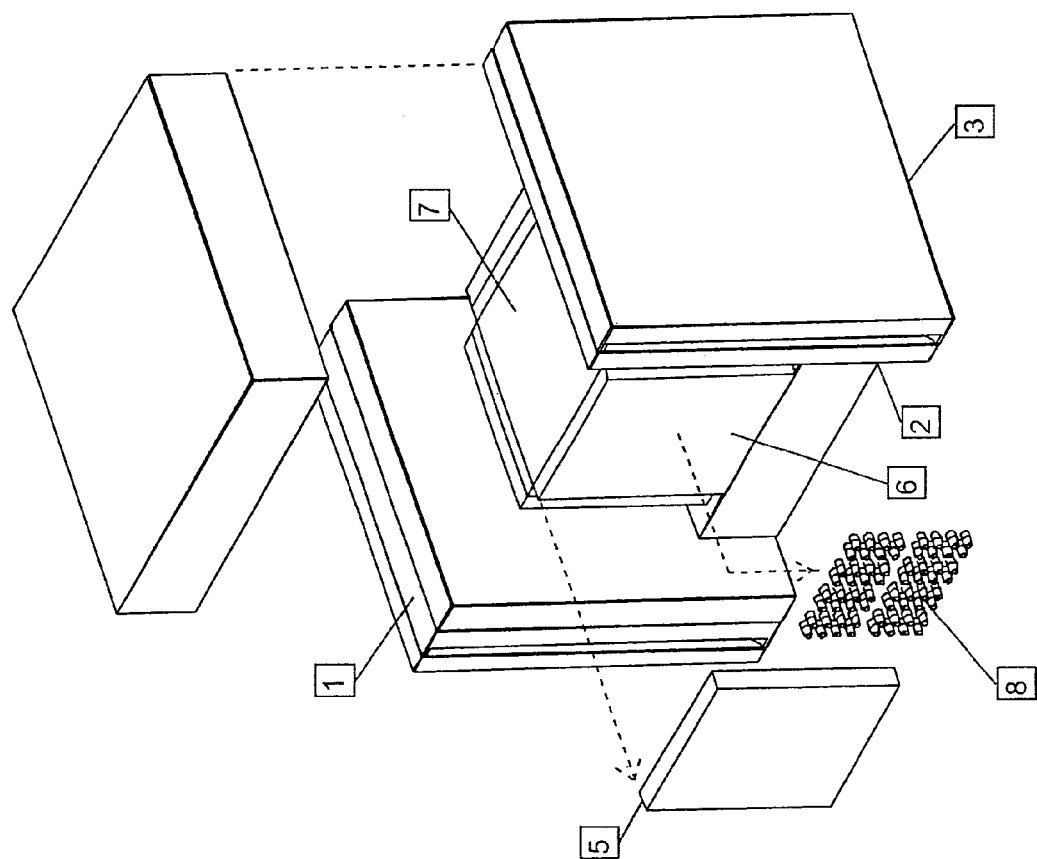

FIG. 7 shows the molded parts 8 being removed from core component 6 after removing cavity component 5.

Figure 8:
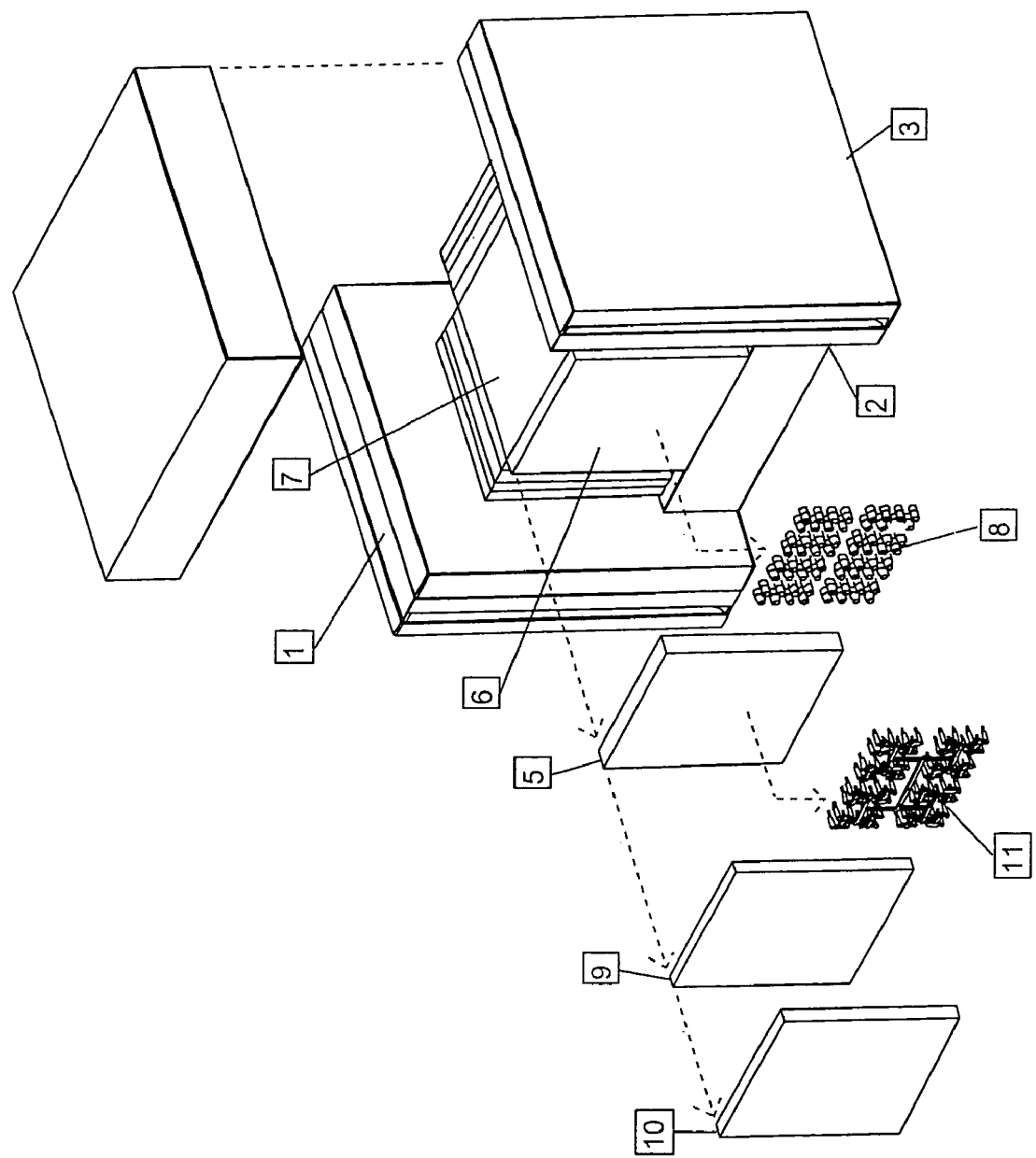

FIG. 8 shows another embodiment with additional components, three plate stripper insert 9, three plate top cavity insert 10 and three plate runner 11.

Figure 9:
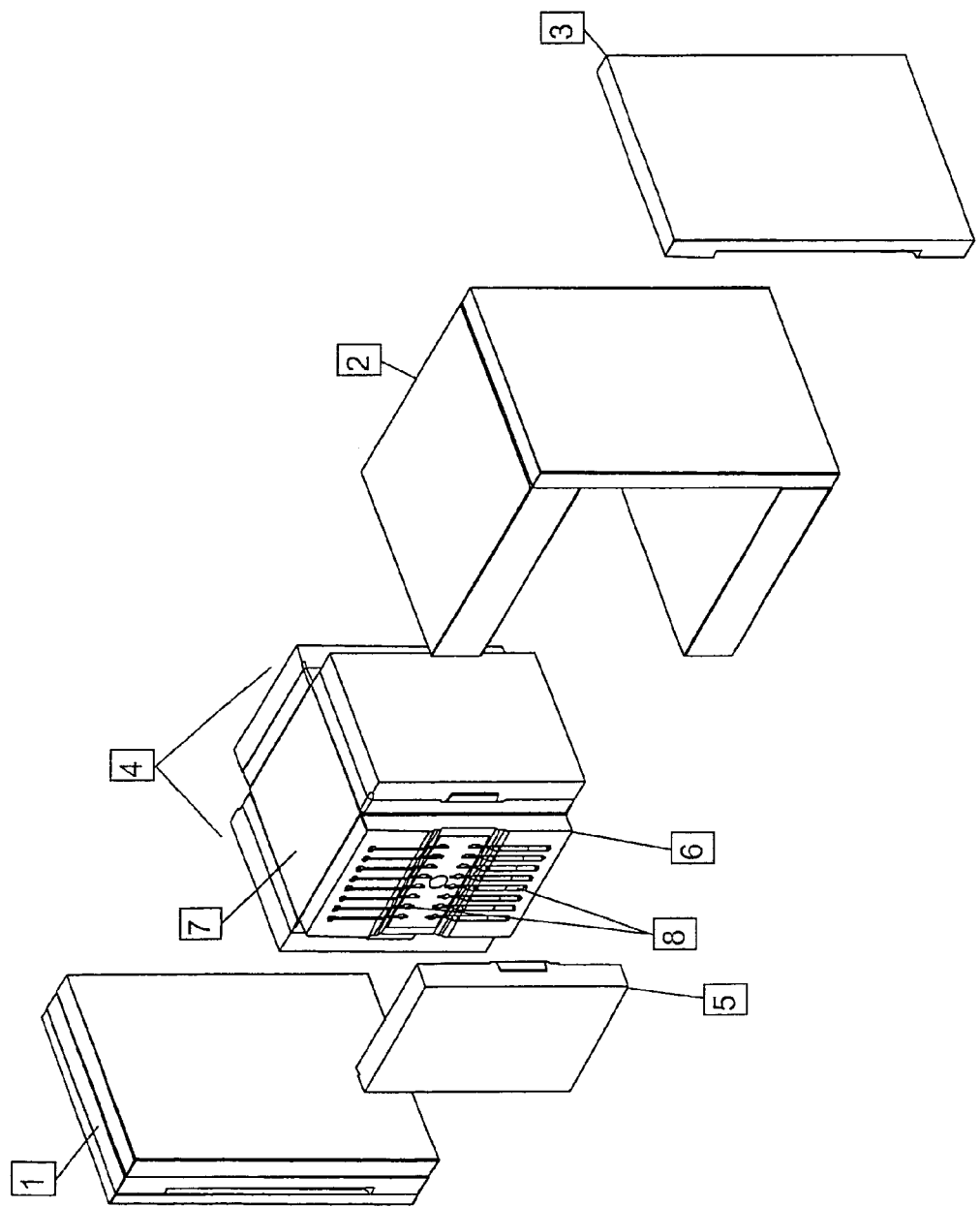

FIG. 9 shows another embodiment in which parts are transferred or rotated into new core and/or cavity details within the same core and cavity inserts 5,6. This embodiment would be used for multi-component applications where the molded article consists of more than one material part.

Figure 10:
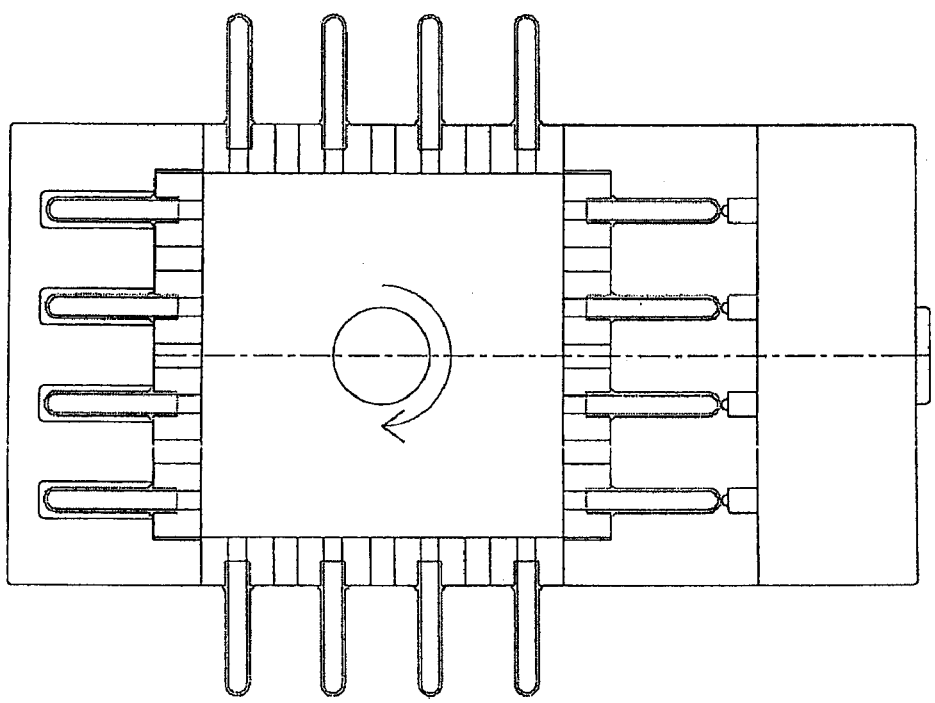

FIG. 10 is an example of molding components in the prior art.

Injection molds may be used for molding a variety of different types of articles and accordingly, is not limited for use with any particular type of article. Toothbrush handles are used throughout this description by way of example only. Other typical molded articles would include razor handles and screwdrivers.

While the turret block shown throughout this description is revolving on a vertical axis, and this is the preferred embodiment, a similar design of a movable turret block that revolves on a horizontal axis is feasible. Accordingly, this invention is not considered limited to the vertical axis feature. This invention contains provisions for an axis of rotation that can be either parallel or perpendicular to the mounting face of the injection molding machine platens.

Figure 1:
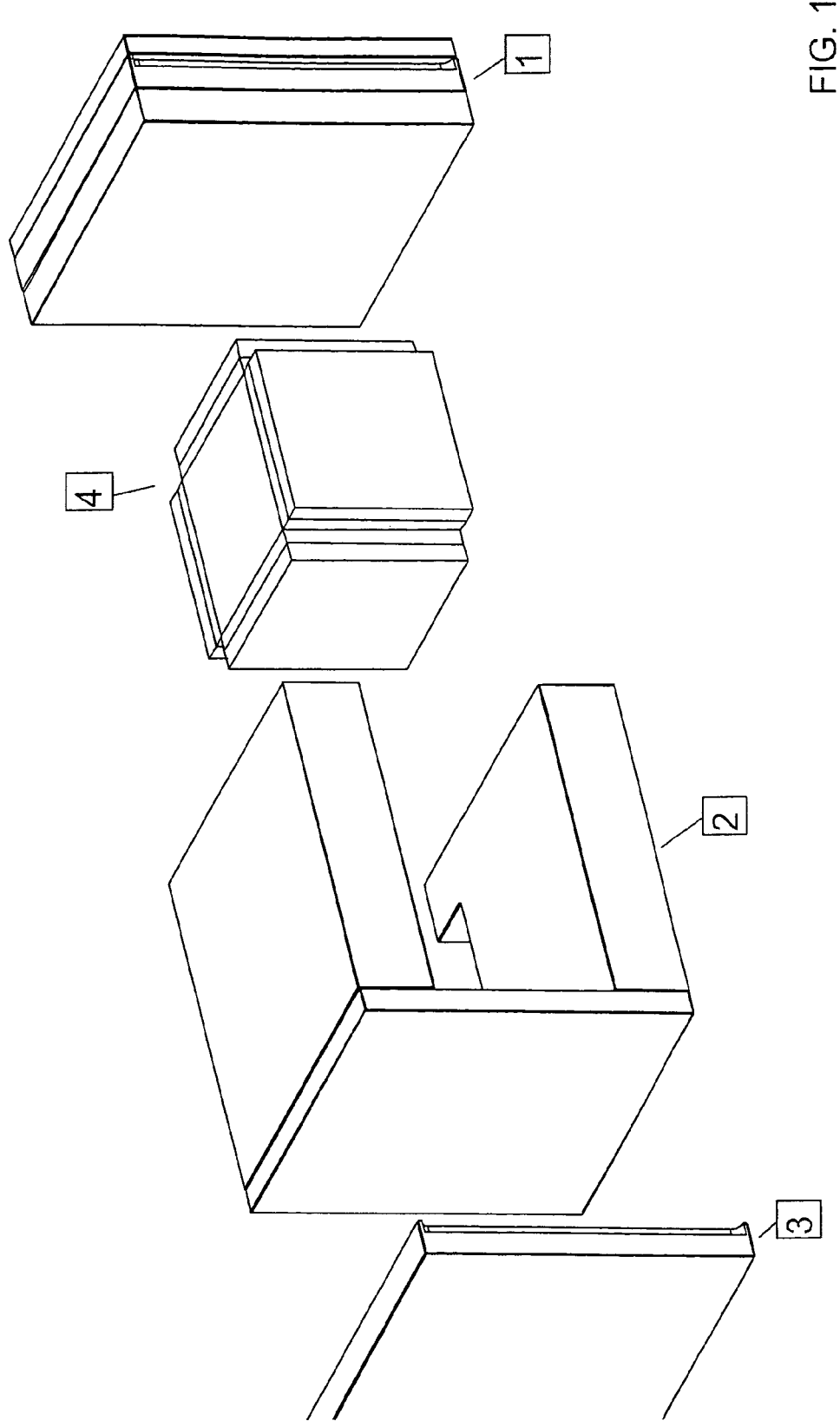
Figure 2:
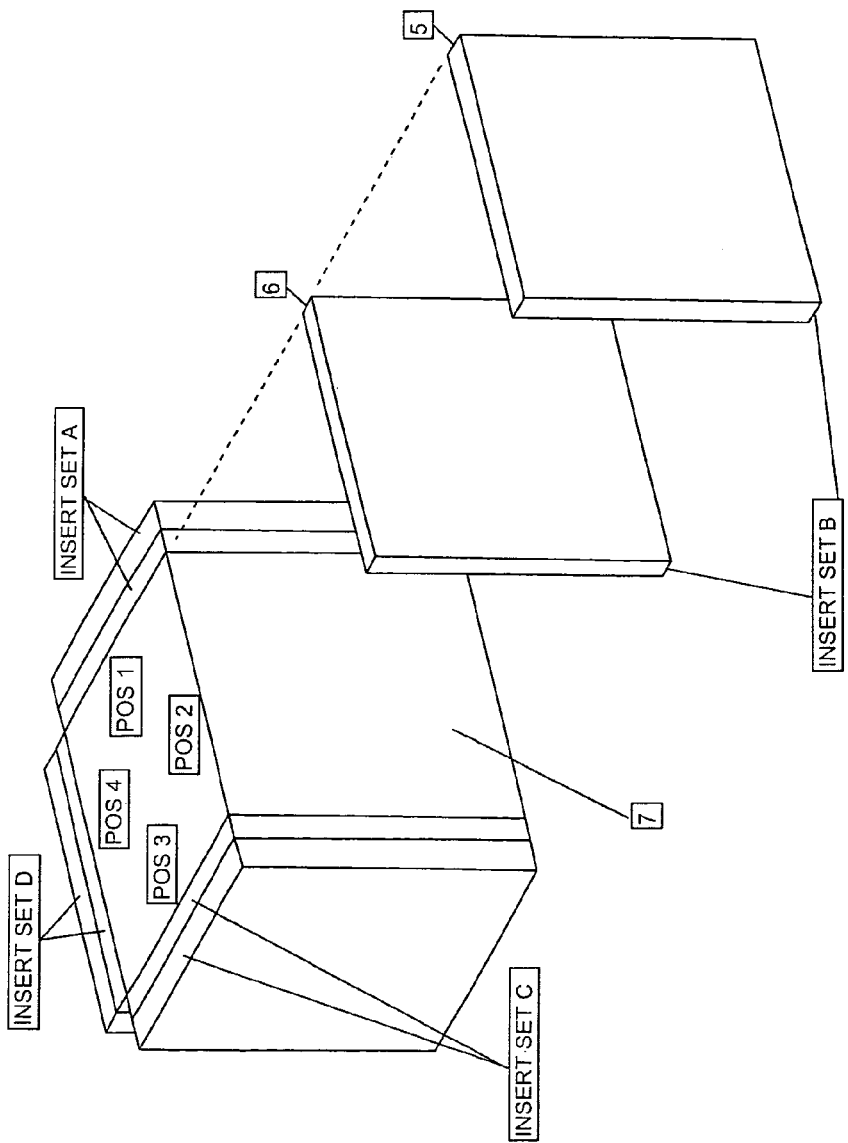

As shown in FIG. 2, the turret block includes a plurality of movable mold halves, i.e. movable mold halves, each set having at least one mold core and cavity, adapted for engagement with the stationary half of the mold mounted to the platen. As shown in FIG. 2, four movable mold halves or faces are provided on a turret block, although any number supportable by the size of the turret block can be used. Sets of mold cavities and cores are adapted to be rotated into horizontal and vertical alignment with the stationary half of the mold.

Referring to FIG. 7, carriage assembly includes a mechanism for separating the cavity insert from the core insert upon final rotation of the turret assembly, thereby enabling the ejection of the molded parts. Such a mechanism may include any combination of pneumatic, hydraulic, electrical, or mechanical components to facilitate the separation of the cavity and core inserts. Either the carriage assembly includes one set of ejector pins, sleeves, or stripper plates or the turret block includes one set of ejector pins, sleeves or stripper plates for each mold half set, and a system for the operation thereof. Accordingly, these sets of ejector pins, sleeves or stripper plates perform the function of stripping the mold halves of finished molded articles, for example, toothbrush handles. If the application for a given molded article does not require sets of ejector pins, sleeves, or stripper plates to perform the stripping function, an auxiliary device could be used. One example would be a robotic device with an end of arm tool apparatus for parts removal from the mold halves.

As an illustration of the invention's operation, the following sequence of action can occur.

Figure 3:
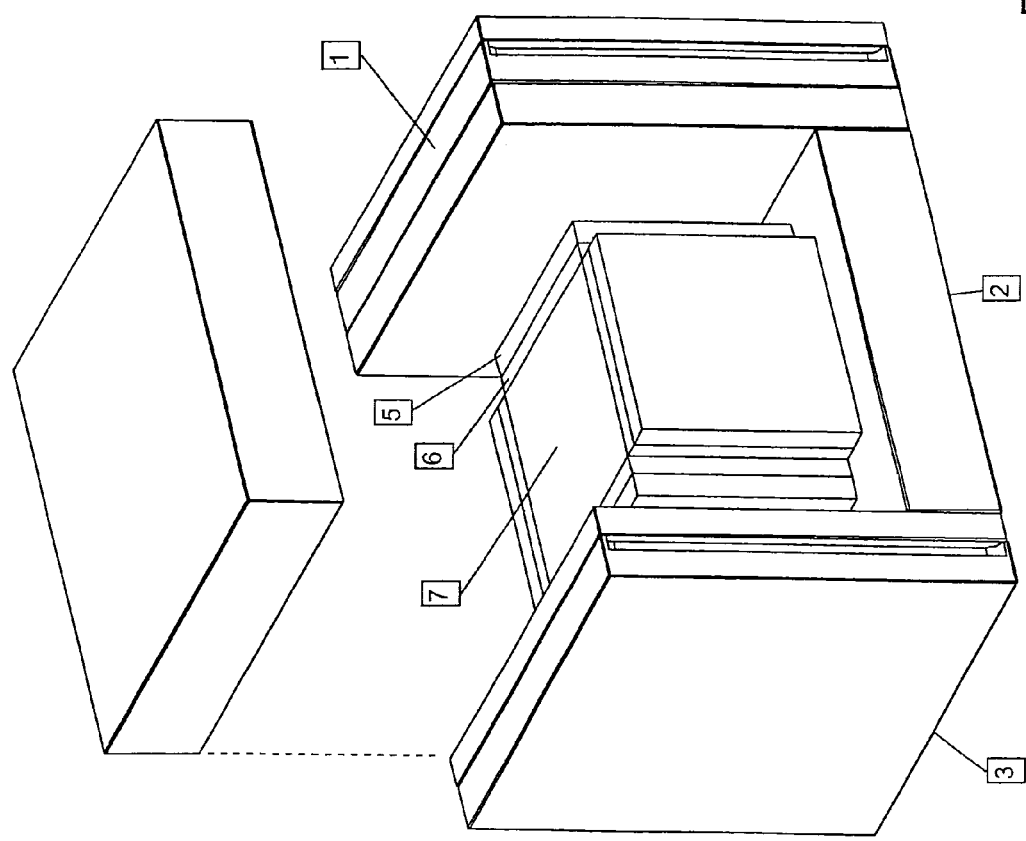
Figure 4:
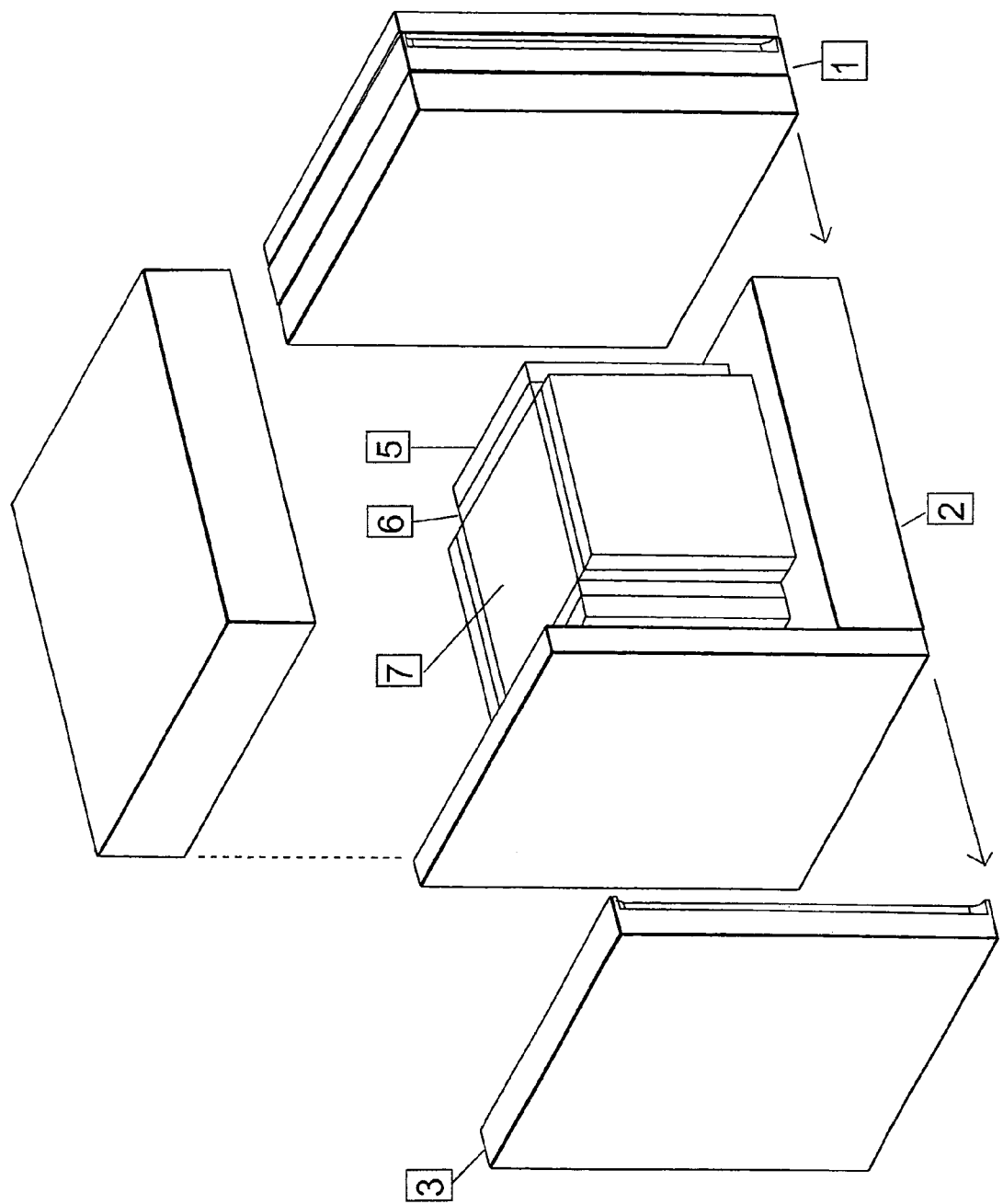
FIG. 4 shows movement of plate 3 away from turret assembly which subsequently moves from away fixed plate 1.
Figure 5:
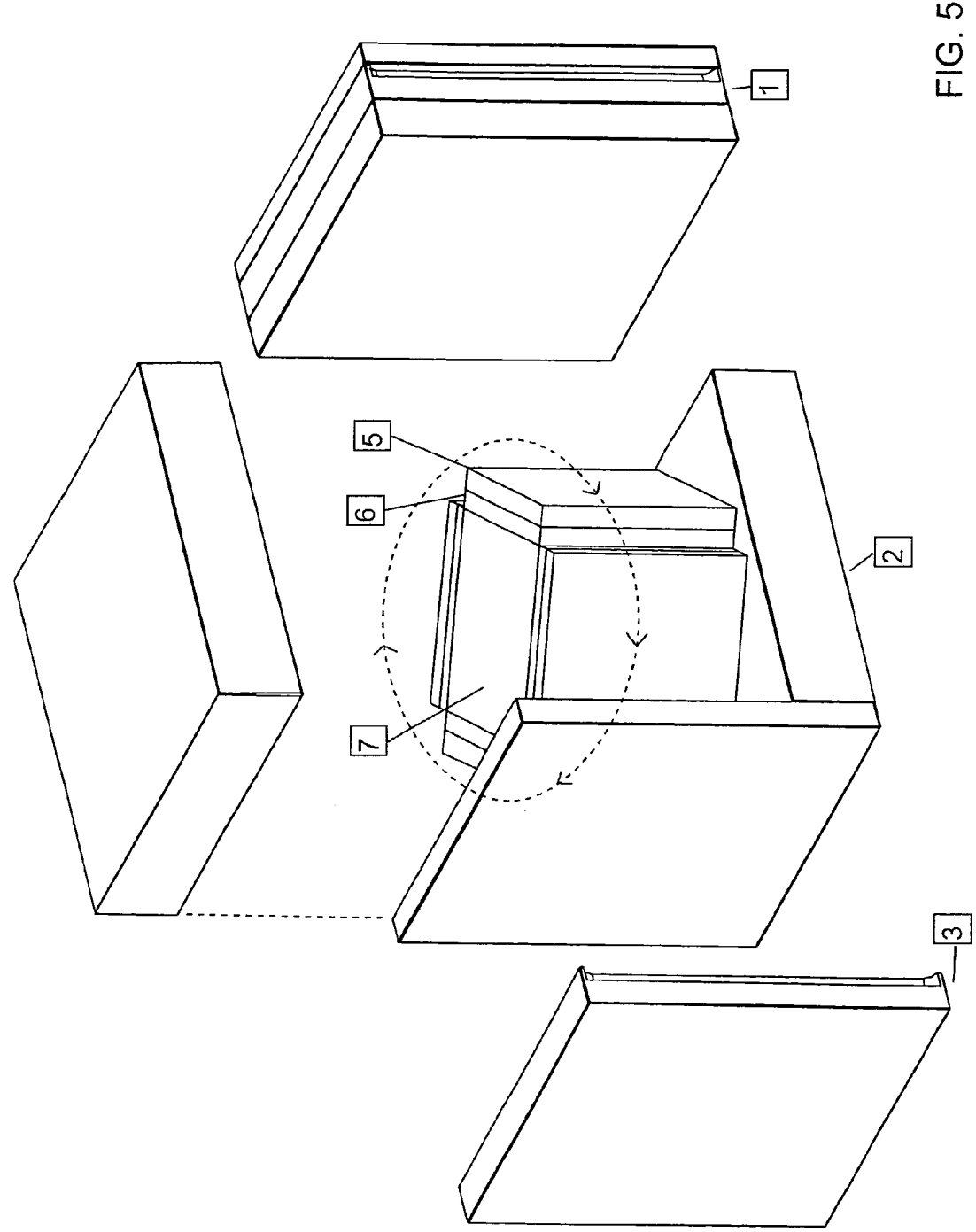
FIG. 5 shows the turret assembly rotating to move an empty mold into position and recently molded parts into a cooling position or an ejection position.
Figure 6:
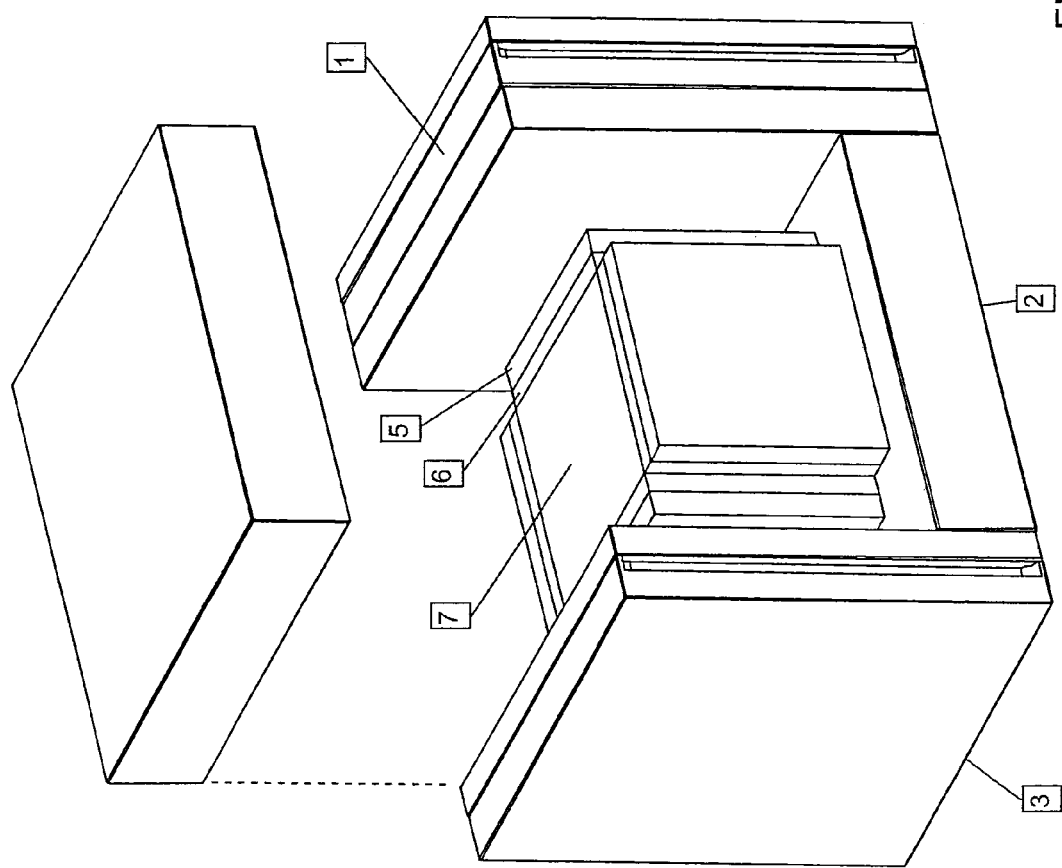
FIG. 6 shows the invention back into ready position for next molding injection.

1. Tool closed in molding position. (FIG. 3)
   A. the cavity inserts (5) are closed against the core inserts (6) in positions 1, 2, 3, & 4.
   B. insert set a is in the molding position.
   C. insert set d is in the ejection position.
   D. the core inserts (6) and the cavity inserts (5) in all positions of the turret assembly (4) are being cooled while the tool is closed.
2. Tool opening. (FIG. 4)
   A. the moving plate (3) moves away from the carriage assembly (2).
   B. the moving plate (3) and the carriage assembly (2) move away from the stationary plates (1). the turret assembly (4) moves with the carriage assembly (2).
   C. the core inserts (6) and the cavity inserts (5) in all positions of the turret assembly (4) are being cooled while the tool opens.
3. Turret rotation. (FIG. 5)
   A. the turret assembly (4) rotates within the carriage assembly (2). the cavity inserts (5) stay closed against the core inserts (6).
   B. the rotation angle is dependent upon the number of insert set stations.
   C. the cavity inserts (5) are retained to the core inserts (6) during rotation.
   D. the core inserts (6) and the cavity inserts (5) in all positions of the turret assembly (4) are being cooled while the turret assembly (4) rotates.
4. Tool closing. (FIG. 6)
   A. the moving plate (3) closes against the carriage assembly (2), which then closes against the stationary plates.
   B. the core inserts (6) and the cover inserts (5) in all positions of the turret assembly (4) are being cooled while the tool closes.
5. Ejection. (FIG. 7)
   A. the cavity insert (5) in position 4 is separated from the core insert (6) which remains attached to the turret assembly (4).
   B. the part(s) are removed from the core insert (6).
   C. the ejection sequence takes place between rotations of the turret assembly (4). this could be during tool close, injection, or tool opening.
   D. the cover insert (5) is returned to the core insert (6) and the turret assembly (4).
   E. the core inserts (6) and the cover inserts (5) in all positions of the turret assembly (4) are being cooled during this operation.
6. the molding cycle repeats.
7. multiple component/material tool (FIG. 9)
   A. during the ejection stage, the cover insert (5) is removed from the core insert (6).
   B. completed parts are removed from the core insert (6).
   C. incomplete parts are transferred within the insert set to subsequent molding position.
   D. the cover insert (5) is returned to the core insert (6). parts transferal is performed by but not limited to indexing plates, stand-alone robotics, or other integrated transfer automation method.
   E. the core inserts (6) and the cover inserts (5) in all positions of the turret assembly (4) are being cooled during all stages of operation.

Accordingly, there is a need for an injection mold which allows the said molded article to remain encapsulated within the cavity and core through multiple movements to cooling and ejection positions and at the same time continuing to mold subsequent molded articles wherein parts are ejected concurrent to the molding cycle upon completion of the number of required movements for said molded article's cooling requirements. Said invention also allows for concurrent insert-loading for molded articles requiring foreign inserted objects prior to the start of the injection molding process.

It is to be understood that the invention is not limited to the embodiments described and shown herein, which are deemed to be merely illustrative of the best modes of carrying out the invention, and which are susceptible to modification of form, size, arrangement of parts and details of operation. The invention rather is intended to encompass all such modifications that are within its spirit and scope as defined by the claims.

What is claimed is:

1. An injection mold apparatus comprising:
   a movable plate mountable to a movable platen of an injection molding machine, the movable plate being configured to move with the movable platen relative to a stationary platen of the injection molding machine;
   a turret assembly including:
   (i) a turret block positionable between the stationary and movable platens of the injection molding machine, the turret block being rotatable about a turret axis, and
   (ii) a first mold component set comprising a first fixed component removably attached to a first face of the turret block and a first movable component coupled to the first fixed component and movable relative to the first fixed component independently of the movement of the movable plate; and
   a carriage assembly coupled to the movable plate and supporting the turret assembly, the carriage assembly including an actuating mechanism to cause the first movable component to move relative to the first fixed component.

2. The injection mold apparatus of claim 1, wherein the turret axis is vertical.

3. The injection mold apparatus of claim 1, wherein the turret assembly further includes a second mold component set comprising a second fixed component removably attached to a second face of the turret block and a second movable component coupled to the second fixed component and movable relative to the second fixed component independently of the movement of the movable plate.

4. The injection mold apparatus of claim 3, wherein the second face is spaced 180 degrees about the turret block from the first face.

5. The injection mold apparatus of claim 3, wherein the turret assembly further includes:
   a third mold component set comprising a third fixed component removably attached to a third face of the turret block and a third movable component coupled to the third fixed component and movable relative to the third fixed component independently of the movement of the movable plate, and
   a fourth mold component set comprising a fourth fixed component removably attached to a fourth face of the turret block and a fourth movable component coupled to the fourth fixed component and movable relative to the fourth fixed component independently of the movement of the movable plate.

6. The injection mold apparatus of claim 5, wherein (a) the first face is spaced 90 degrees about the turret block from the second face, (b) the second face is spaced 90 degrees about the turret block from the third face, (c) the third face is spaced 90 degrees about the turret block from the fourth face, and (d) the fourth face is spaced 90 degrees about the turret block from the first face.

7. The injection mold apparatus of claim 1, further comprising ejection equipment to eject a molded part from the first mold component set.

8. The injection mold apparatus of claim 7, wherein the ejection equipment is selected from a group consisting of ejector pins, sleeves, stripper plates, auxiliary devices and combinations thereof.

9. The injection mold apparatus of claim 7, wherein the carriage assembly includes the ejection equipment.

10. The injection mold apparatus of claim 7, wherein the turret block includes the ejection equipment.

11. The injection mold apparatus of claim 1, wherein the actuating mechanism is selected from a group consisting of pneumatic elements, electrical elements, mechanical elements, and combinations thereof.

12. The injection mold apparatus of claim 1, further comprising a fixed plate coupled to the carriage assembly and mountable to the stationary platen of the injection molding machine.

13. The injection mold apparatus of claim 12, wherein the movable plate is configured to press against the carriage assembly, which is configured to press against the fixed plate, when the apparatus is in a closed position.

14. The injection mold apparatus of claim 12, wherein the movable plate is configured to be separated from the carriage assembly, which is configured to be separated from the fixed plate when the apparatus is in an open position.

15. The injection mold apparatus of claim 1, wherein the first movable component is configured to contact the first fixed component while the turret block rotates.

16. The injection mold apparatus of claim 1, further comprising a transfer mechanism configured to move an article from a first location between the first fixed component and the first movable component to a second location between the first fixed component and the second movable component.

17. An injection mold apparatus comprising:
   a movable plate mountable to a movable platen of an injection molding machine, the movable plate being configured to move with the movable platen relative to a stationary platen of the injection molding machine;
   a turret assembly including:
   (i) a turret block positionable between the stationary and movable platens of the injection molding machine, the turret block being rotatable about a vertical turret axis, and
   (ii) a first mold component set comprising a first fixed component removably attached to a first face of the turret block and a first movable component coupled to the first fixed component and movable relative to the first fixed component independently of the movement of the movable plate;
   (iii) a second mold component set comprising a second fixed component removably attached to a second face of the turret block, the second face being spaced 180 degrees about the turret block from the first face, and a second movable component coupled to the second fixed component and movable relative to the second fixed component independently of the movement of the movable plate;

a carriage assembly coupled to the movable plate and supporting the turret assembly, the carriage assembly including an actuating mechanism to cause the first movable component to move relative to the first fixed component; and means for ejecting molded parts from the apparatus.

18. The injection mold apparatus of claim 17, wherein the turret assembly further includes:

a third mold component set comprising a third fixed component removably attached to a third face of the turret block and a third movable component coupled to the third fixed component and movable relative to the third fixed component independently of the movement of the movable plate, and a fourth mold component set comprising a fourth fixed component removably attached to a fourth face of the turret block and a fourth movable component coupled to the fourth fixed component and movable relative to the fourth fixed component independently of the movement of the movable plate.

19. The injection mold apparatus of claim 18, wherein the third face is spaced 90 degrees about the turret block from both the first face and the second face and is spaced 180 degrees about the turret block from the fourth face.

20. The injection mold apparatus of claim 17, further comprising a fixed plate coupled to the carriage assembly and mountable to the stationary platen of the injection molding machine, wherein the movable plate is configured to press against the carriage assembly, which is configured to press against the fixed plate when the apparatus is in a closed position.

21. The injection mold apparatus of claim 17, further comprising a fixed plate coupled to the carriage assembly and mountable to the stationary platen of the injection molding machine, wherein the movable plate is configured to be separated from the carriage assembly, which is configured to be separated from the fixed plate when the apparatus is in an open position.

22. The injection mold apparatus of claim 17, wherein, while the turret block rotates, the first movable component is configured to contact the first fixed component and the second movable component is configured to contact the second fixed component.

23. The injection mold apparatus of claim 17, further comprising a transfer mechanism configured to move an article from a first location in the first mold component set to a second location in the first mold component set.

* * * * *